(12) United States Patent
Qiu et al.

(10) Patent No.: US 11,565,604 B2
(45) Date of Patent: *Jan. 31, 2023

(54) ELECTRIC VEHICLE

(71) Applicant: TOYOTA JIDOSHA KABUSHIKI KAISHA, Toyota (JP)

(72) Inventors: Zekai Qiu, Nisshin (JP); Hironobu Kitaoka, Nisshin (JP); Naoki Yamamuro, Nagoya (JP); Kozo Kosho, Toyota (JP); Hiroaki Sugiyama, Nagoya (JP); Makoto Ikegami, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,528

(22) Filed: Jul. 30, 2020

(65) Prior Publication Data

US 2020/0353841 A1 Nov. 12, 2020

Related U.S. Application Data

(63) Continuation of application No. 16/177,363, filed on Oct. 31, 2018, now Pat. No. 10,759,302.

(30) Foreign Application Priority Data

Nov. 2, 2017 (JP) .............................. JP2017-212816

(51) Int. Cl.
*B60L 58/13* (2019.01)
*B60L 1/00* (2006.01)
(Continued)

(52) U.S. Cl.
CPC ................. *B60L 58/13* (2019.02); *B60L 1/00* (2013.01); *B60N 3/104* (2013.01); *B60Q 9/00* (2013.01);
(Continued)

(58) Field of Classification Search
CPC ........ B60L 58/13; B60L 1/00; B60L 2210/10; B60L 2240/60; B60N 3/104; B60Q 9/00
See application file for complete search history.

(56) References Cited

U.S. PATENT DOCUMENTS 5,892,346 A 4/1999 Moroto et al.
6,435,294 B1 8/2002 Hara et al.
(Continued)

FOREIGN PATENT DOCUMENTS

JP 2001119808 A 4/2001
JP 2010119160 A 5/2010
(Continued)

OTHER PUBLICATIONS

Machine Translation of JP2011160613A (Year: 2011).*
(Continued)

*Primary Examiner* — Faris S Almatrahi
*Assistant Examiner* — Sahar Motazedi
(74) *Attorney, Agent, or Firm* — Hunton Andrews Kurth LLP

(57) ABSTRACT

An electric vehicle includes: a rotary electric machine configured to generate a driving force for driving driving wheels; a driving battery storing power to drive the rotary electric machine; a converter connected to the driving battery; an auxiliary battery connected to the driving battery via the converter; and a cooling box connected to the auxiliary battery. When the driving battery has an SOC reduced to be smaller than a prescribed threshold value, the converter is stopped and power remaining in the auxiliary battery is used to drive the cooling box.

2 Claims, 7 Drawing Sheets

(51) Int. Cl.
*B60Q 9/00* (2006.01)
*B60N 3/10* (2006.01)

(52) U.S. Cl.
CPC ....... *B60L 2210/10* (2013.01); *B60L 2240/60* (2013.01)

(56) References Cited

U.S. PATENT DOCUMENTS

| | | |
|---|---|---|
| 8,412,476 B2 | 4/2013 | Kato |
| 2007/0193792 A1 | 8/2007 | Yamaguchi et al. |
| 2008/0169651 A1 | 7/2008 | Oyobe et al. |
| 2009/0001926 A1 | 1/2009 | Sato |
| 2010/0121590 A1 | 5/2010 | Kato |
| 2012/0109442 A1 | 5/2012 | Kato et al. |
| 2012/0176231 A1 | 7/2012 | Skaff et al. |
| 2012/0299377 A1 | 11/2012 | Masuda et al. |
| 2013/0231811 A1 | 9/2013 | Aoki |
| 2014/0214251 A1 | 7/2014 | Sugiyama |
| 2015/0258911 A1 | 9/2015 | Sugiyama |
| 2016/0111908 A1 | 4/2016 | Kwark et al. |
| 2019/0126772 A1 | 5/2019 | Qiu et al. |
| 2021/0094441 A1* | 4/2021 | Sampson ................. B60K 1/02 |

FOREIGN PATENT DOCUMENTS

| | | | |
|---|---|---|---|
| JP | 2010226795 A | | 10/2010 |
| JP | 2011160613 A | * | 8/2011 |
| JP | 4886099 B1 | | 2/2012 |
| JP | 2012101616 A | | 5/2012 |
| WO | 12141214 A1 | | 10/2012 |

OTHER PUBLICATIONS

Nameki, Minoru, Machine Translation of JP 2010226795-A (Year: 2010).

Funai, Kenji, Description of JP-2012101616-A in English (Year: 2012).

Iwata Makoto, Description of WO-2012141214-A1 in English (Year: 2012).

* cited by examiner

ELECTRIC VEHICLE

This is a continuation application of U.S. patent application Ser. No. 16/177,363, filed Oct. 31, 2018, which is based on Japanese Patent Application No. 2017-212816 filed on Nov. 2, 2017 with the Japan Patent Office, the entire contents of all which are hereby incorporated by reference.

BACKGROUND

Field

The present disclosure relates to an electric vehicle, and more particularly, to an electric vehicle provided with a cooling box.

Description of the Background Art

International Publication No. 2012/141214 describes a vehicle in which devices such as a car stereo, a camera, an air conditioner and the like are detachably configured and each device is provided with a battery integrally.

SUMMARY

Generally, an electric vehicle comprises a rotary electric machine that rotates driving wheels, and a driving battery that supplies power to the rotary electric machine.

When installing a cooling box in such an electric vehicle as described above, a converter connected to the driving battery and an auxiliary battery connected to the converter and the cooling box may be provided for example.

The converter may adjust the voltage of the power from the driving battery and supply it to the auxiliary battery, which may in turn supply power to the cooling box.

However, depending on the SOC of the driving battery, it may be difficult to reach a destination set by a user. In such a case, driving the converter to supply power to the cooling box requires power necessary for driving the converter, and as a result it may be impossible to reach the destination.

The present disclosure has been made in view of the above-described problem, and an object thereof is to provide an electric vehicle that can reach a destination by reducing wasteful power consumption when the driving battery has a small SOC.

An electric vehicle according to the present disclosure comprises: a rotary electric machine configured to generate a driving force for driving driving wheels; a driving battery storing power to drive the rotary electric machine; a converter connected to the driving battery; an auxiliary battery connected to the driving battery via the converter; and a cooling box connected to the auxiliary battery. The auxiliary battery is supplied with power from the driving battery by driving the converter. When an SOC of the driving battery becomes smaller than a prescribed threshold value, the converter is stopped and the cooling box is driven by using power remaining in the auxiliary battery.

The above electric vehicle further comprises an input device operated to input a destination. An amount of power in the driving battery, when the SOC of the driving battery is the threshold value, is larger than an amount of power required for the electric vehicle to travel from a current position to reach the destination input to the input device.

An amount of power in the driving battery, when the SOC of the driving battery is the threshold value, is an amount of power required for the electric vehicle to travel a prescribed distance.

The electric vehicle further comprises a notification device configured to notify a user of information. When the SOC of the driving battery becomes smaller than the threshold value, the notification device notifies the user of a drivable period of time of the cooling box.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
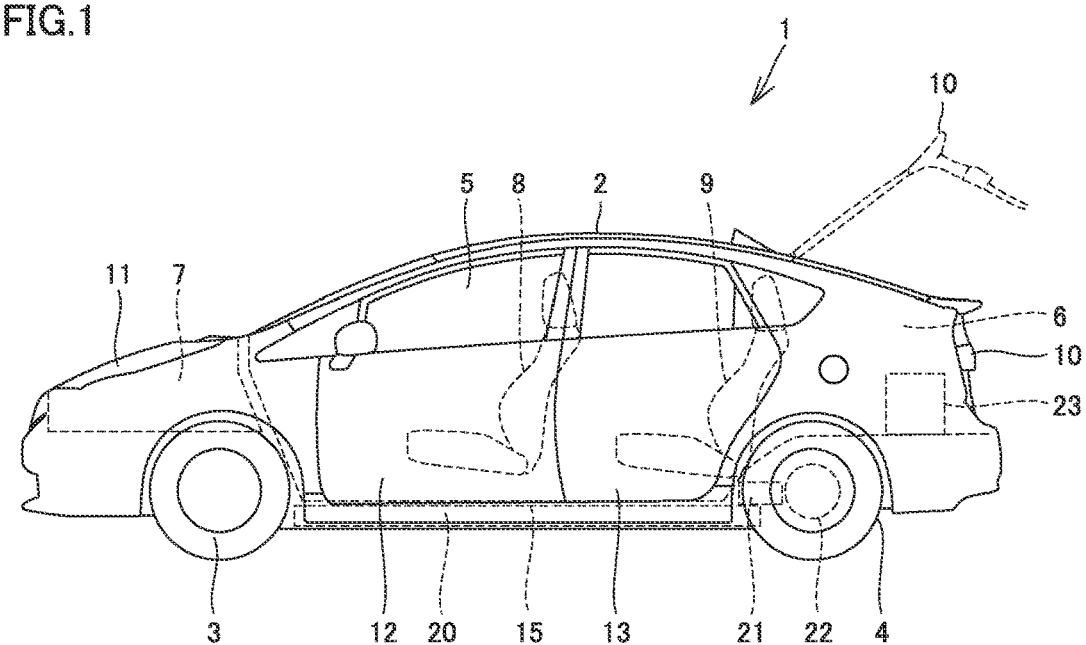
FIG. 1 is a side view of an electric vehicle 1 according to the present embodiment.

An electric vehicle 1 according to the present embodiment will be described with reference to FIGS. 1 to 11. Of the configurations shown in FIG. 1 to FIG. 11, any configuration that is identical or substantially identical is identically denoted and will not be described redundantly. FIG. 1 is a side view of electric vehicle 1 according to the present embodiment. Electric vehicle 1 includes a main body 2, a front wheel 3, and a rear wheel 4. Front wheel 3 is disposed frontwardly of a center of main body 2 in a front-rear direction thereof. Rear wheel 4 is disposed rearwardly of the center of main body 2 in the front-rear direction thereof.

Main body 2 has a passenger compartment 5 and accommodation compartments 6, 7 formed therein. Passenger compartment 5 is a space in which a passenger is accommodated. Accommodation compartment 6 is formed rearwardly of passenger compartment 5. Accommodation compartment 7 is formed frontwardly of passenger compartment 5.

Main body 2 includes a rear hatch 10, a front hatch 11, a front door 12, and a rear door 13. Rear hatch 10 is provided to main body 2 so as to open and close accommodation compartment 6. Front hatch 11 is provided to main body 2 so as to open and close accommodation compartment 7. Front door 12 and rear door 13 are provided so as to open and close passenger compartment 5. By opening and closing front door 12 and rear door 13, a passenger can get in and off passenger compartment 5.

Electric vehicle 1 includes a front seat 8 and a rear seat 9. Front seat 8 is provided on a side closer to a front side of electric vehicle 1 than rear seat 9 is. Rear seat 9 is provided so as to define passenger compartment 5 and accommodation compartment 6.

Figure 2:
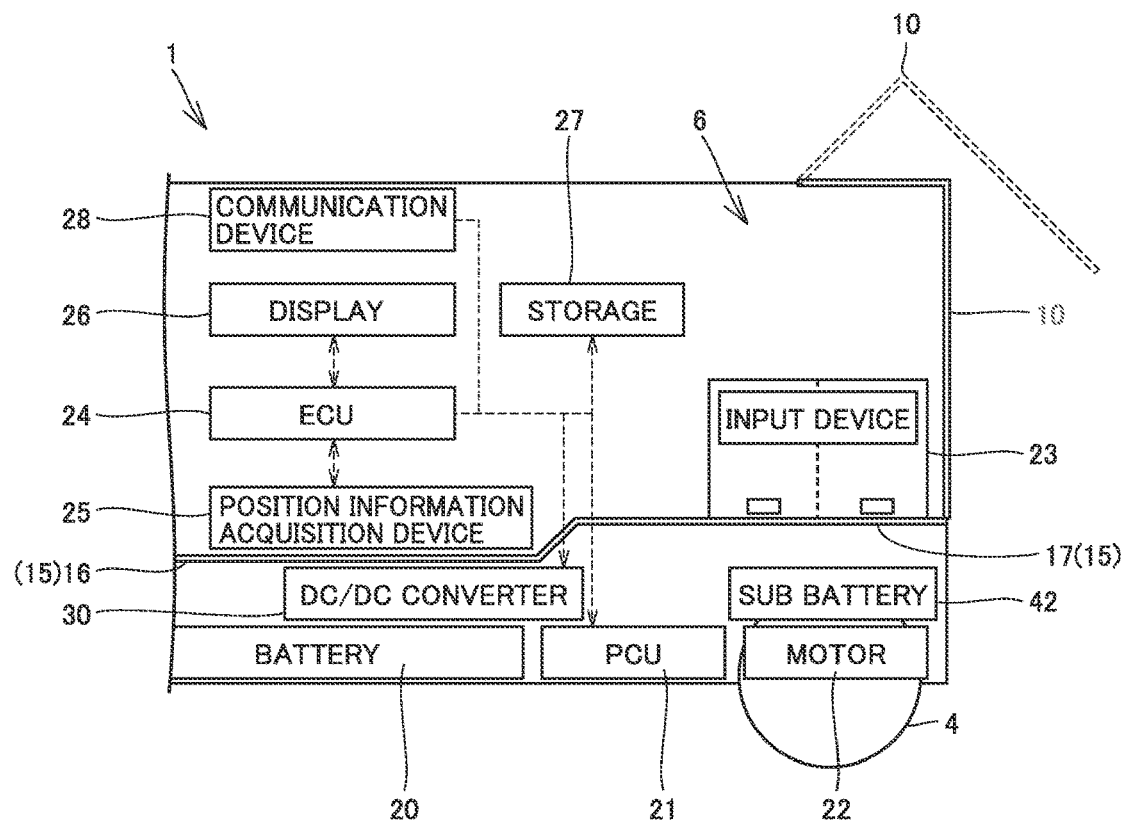
FIG. 2 is a block diagram schematically showing a rear side of electric vehicle 1.

FIG. 2 is a block diagram schematically showing a rear side of electric vehicle 1. Electric vehicle 1 includes a floor panel 15, a battery 20, a PCU (Power Control Unit) 21, a rotary electric machine 22, a cooling box 23, an ECU (Electronic Control Unit) 24, a position information acquisition device 25, a display 26, a storage 27, a communication device 28, a DC/DC converter (a converter) 30, and an auxiliary battery 42.

Floor panel 15 is a plate-shaped metal member forming a bottom surface of main body 2. Floor panel 15 includes a center panel 16 and a rear panel 17. Center panel 16 forms a bottom surface of passenger compartment 5, and rear panel 17 forms a bottom surface of accommodation compartment 6.

Position information acquisition device 25 acquires position information of electric vehicle 1 from outside of vehicle 1, and transmits the acquired information to ECU 24.

Storage 27 is a nonvolatile memory. Storage 27 stores data stored in advance, data acquired through display 26 and communication device 28, and the like. The data stored in advance includes a map database, a database for calculating the SOC of battery 20, a database for calculating an outputtable amount of power of battery 20, a database for calculating a travelable distance of electric vehicle 1, a database for calculating the SOC of auxiliary battery 42, a database for calculating an outputtable amount of power of auxiliary battery 42, and a database for calculating power for driving cooling box 23.

The database for calculating the SOC of battery 20 is a database for calculating the SOC of battery 20 from a result of measurement by a current sensor 44, a voltage sensor 43, and a temperature sensor 45 described later. The database for calculating an outputtable amount of power of battery 20 is a database for calculating an amount of power that can be output by battery 20 based on the SOC of battery 20.

The database for calculating the SOC of auxiliary battery 42 is a database for calculating the SOC of auxiliary battery 42 from a result of measurement by a voltage sensor 32 described later. The database for calculating an outputtable amount of power of auxiliary battery 42 is a database for calculating an amount of power that can be output by auxiliary battery 42 based on the SOC of auxiliary battery 42.

The database for calculating power for driving cooling box 23 is a database for calculating power required for driving cooling box 23 from the current temperature of a refrigerating compartment of cooling box 23, a target temperature of the refrigerating compartment, the current temperature of a freezing compartment of cooling box 23, and a target temperature of the freezing compartment.

Display 26 is, for example, a touch panel type liquid crystal display screen, and notifies a user of various types of information. By operating display 26, the user can set a destination, for example. In this way, display 26 has functions of both a notification device and an input device in the present specification. It is not necessary to integrate the notification device and the input device together, and they may be provided discretely. Display 26 transmits input destination information to ECU 24.

Based on the destination information input to display 26 and the map information stored in storage 27, ECU 24 calculates an estimated arrival time to the input destination. ECU 24 displays the calculated estimated arrival time on display 26, for example.

Communication device 28 is configured to communicate with an external communication device, a server, and the like, and communication device 28 transmits received various information to ECU 24.

Battery 20, PCU 21, rotary electric machine 22, DC/DC converter 30, and auxiliary battery 42 are disposed on the side of a lower surface of floor panel 15.

Figure 3:
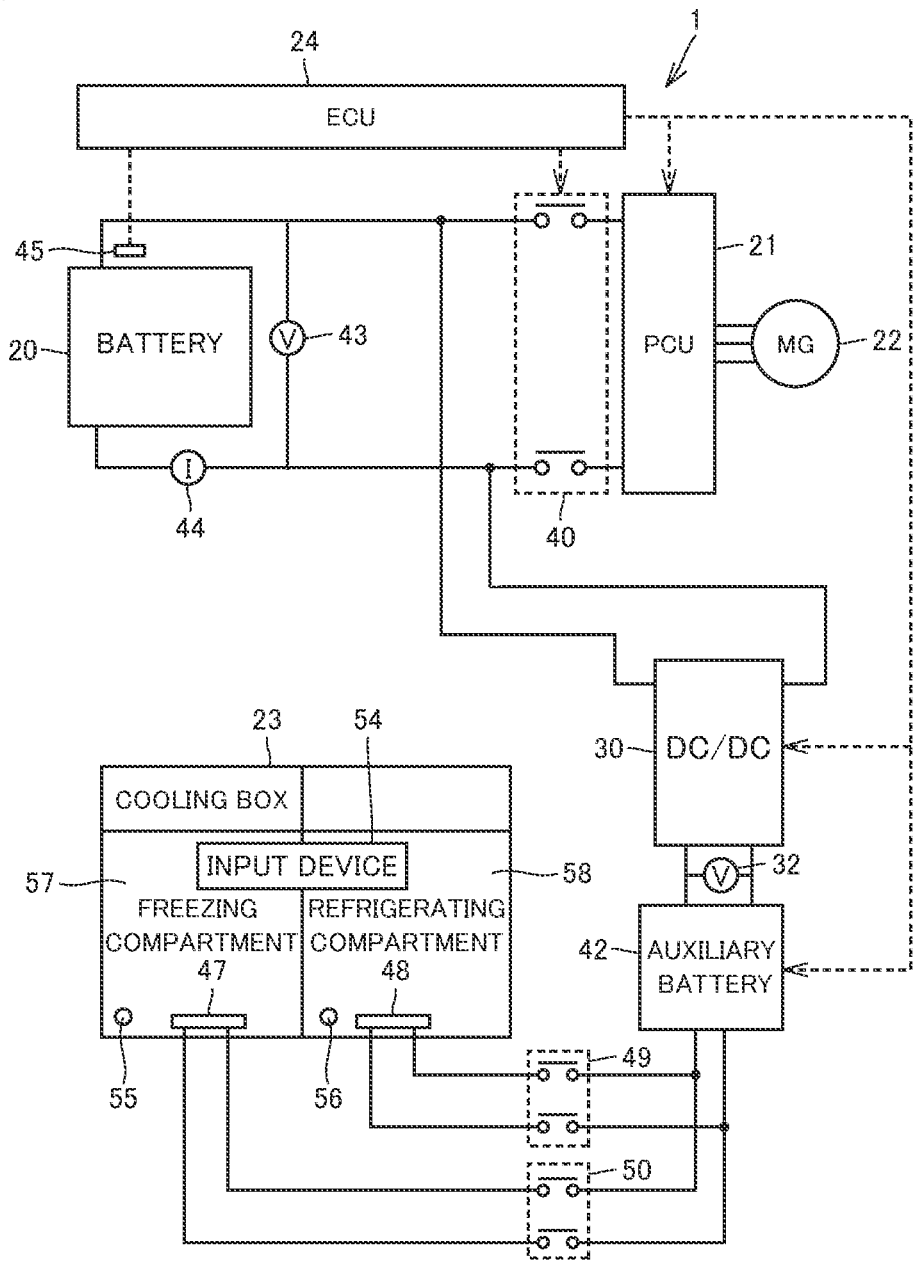
FIG. 3 is a block diagram showing a configuration of electric vehicle 1.

FIG. 3 is a block diagram showing a configuration of electric vehicle 1.

Electric vehicle 1 further comprises voltage sensor 32, an SMR (system main relay) 40, a DC/DC converter 30, an auxiliary battery 42, voltage sensor 43, current sensor 44, and temperature sensor 45.

Battery 20 is a chargeable and dischargeable secondary battery such as, for example, a lithium ion battery or the like. PCU 21 includes a DC/DC converter and an inverter. PCU 21 is connected to rotary electric machine 22 via SMR 40. PCU 21 boosts the voltage of the DC power supplied from battery 20 and converts it into AC power.

Rotary electric machine 22 is connected to PCU 21. Rotary electric machine 22 uses the AC power supplied from PCU 21 to drive rear wheel (a driving wheel) 4 shown in FIG. 2 and the like. Thus, electric vehicle 1 runs. Thus, the vehicle according to the present embodiment is an electric vehicle.

Temperature sensor 45 measures the temperature of battery 20, and transmits the measurement result to ECU 24. Current sensor 44 measures an amount of a current flowing into battery 20 and an amount of a current flowing out of battery 20, and transmits the measurement results to ECU 24. Voltage sensor 43 measures the voltage of battery 20 and transmits the measurement result to ECU 24.

ECU 24 uses the measurement results received from temperature sensor 45, current sensor 44, and voltage sensor 43 to calculate a state of charge (SOC) of battery 20 and an amount of power stored in battery 20.

DC/DC converter 30 is connected to battery 20. DC/DC converter 30 is connected between SMR 40 and battery 20. Auxiliary battery 42 is connected to DC/DC converter 30. Cooling box 23 is connected to auxiliary battery 42 via relays 49, 50. Voltage sensor 32 measures the voltage of auxiliary battery 42 and transmits it to ECU 24.

Figure 4:
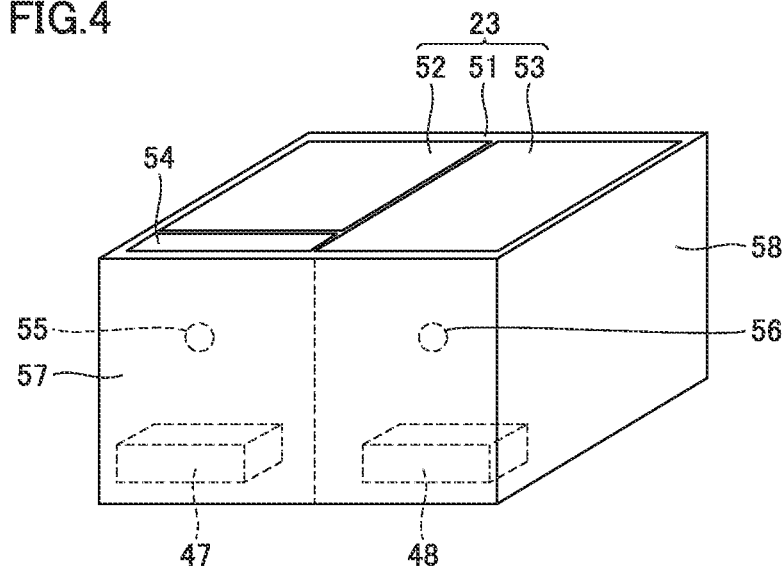
FIG. 4 is a schematic perspective view of a cooling box 23.

FIG. 4 is a schematic perspective view of cooling box 23. Cooling box 23 includes a main body 51, lids 52 and 53, temperature sensors 55 and 56, Peltier elements 47 and 48, and operation unit 54. In main body 51, freezing compartment 57 and refrigerating compartment 58 are formed.

Lid 52 is provided to main body 51 so as to be capable of opening and closing freezing compartment 57. Lid 53 is provided to main body 51 so as to be capable of opening and closing refrigerating compartment 58.

Peltier element 47 and temperature sensor 55 are provided in freezing compartment 57, and Peltier element 48 and temperature sensor 56 are provided in refrigerating compartment 58.

Temperature sensor 55 measures the temperature inside the freezing compartment and transmits the measurement result to ECU 24, whereas temperature sensor 56 measures the temperature inside the refrigerating compartment and transmits the measurement result to ECU 24.

Figure 5:
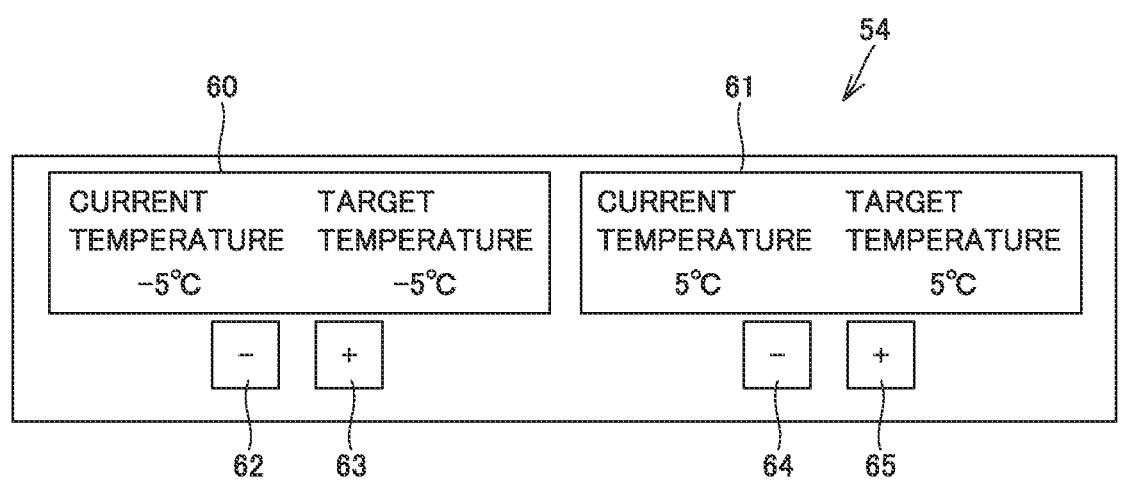
FIG. 5 schematically shows an operation unit 54.

FIG. 5 schematically shows operation unit 54. Operation unit 54 includes temperature displays 60, 61 and operating parts 62, 63, 64, 65.

Temperature display 60 displays the current temperature in freezing compartment 57 and a target temperature thereof, and temperature display 61 displays the current temperature in refrigerating compartment 58 and a target temperature thereof.

By operating operating parts 62 and 63, the target temperature of freezing compartment 57 can be changed, and by operating operating parts 64 and 65, the target temperature of refrigerating compartment 58 can be changed. Operation unit 54 transmits to ECU 24 information indicating an input target temperature.

Returning to FIG. 3, Peltier element 47 is connected to auxiliary battery 42 via relay 50, and Peltier element 48 is connected to auxiliary battery 42 via relay 49. ECU 24 switches on/off relays 49, 50 based on the target temperature received from operation unit 54 and the measured temperatures received from temperature sensors 55, 56.

In electric vehicle 1 configured as described above, when the measured temperature in freezing compartment 57 is higher than the target temperature, ECU 24 closes relay 50 to supply the power of auxiliary battery 42 to Peltier element 47. By driving Peltier element 47, freezing compartment 57 is cooled. Similarly, when lowering the temperature in refrigerating compartment 58, ECU 24 closes relay 49 to supply the power of auxiliary battery 42 to Peltier element 48.

ECU 24 calculates an SOC of auxiliary battery 42 based on the measurement result of voltage sensor 32. When it is determined that the SOC of auxiliary battery 42 becomes lower than a prescribed value, DC/DC converter 30 is driven to charge auxiliary battery 42 with the power from battery 20. DC/DC converter 30 converts the voltage of the power received from battery 20 and supplies it to auxiliary battery 42. DC/DC converter 30 is connected between SMR 40 and battery 20 and accordingly, even when SMR 40 is off, auxiliary battery 42 can be charged by driving DC/DC converter 30. When auxiliary battery 42 is charged using DC/DC converter 30, a loss is caused in DC/DC converter 30.

In electric vehicle 1 configured as described above, when battery 20 has a reduced SOC, DC/DC converter 30 is stopped and the power remaining in battery 20 is used to drive rotary electric machine 22, and Peltier elements 47 and 48 are driven by using the power remaining in auxiliary battery 42.

This can suppress a loss caused in DC/DC converter 30, and as a result, the power remaining in battery 20 can be effectively used for running electric vehicle 1. Thus, even when the SOC of battery 20 is reduced, a cruisable distance of electric vehicle 1 can be increased.

Figure 6:
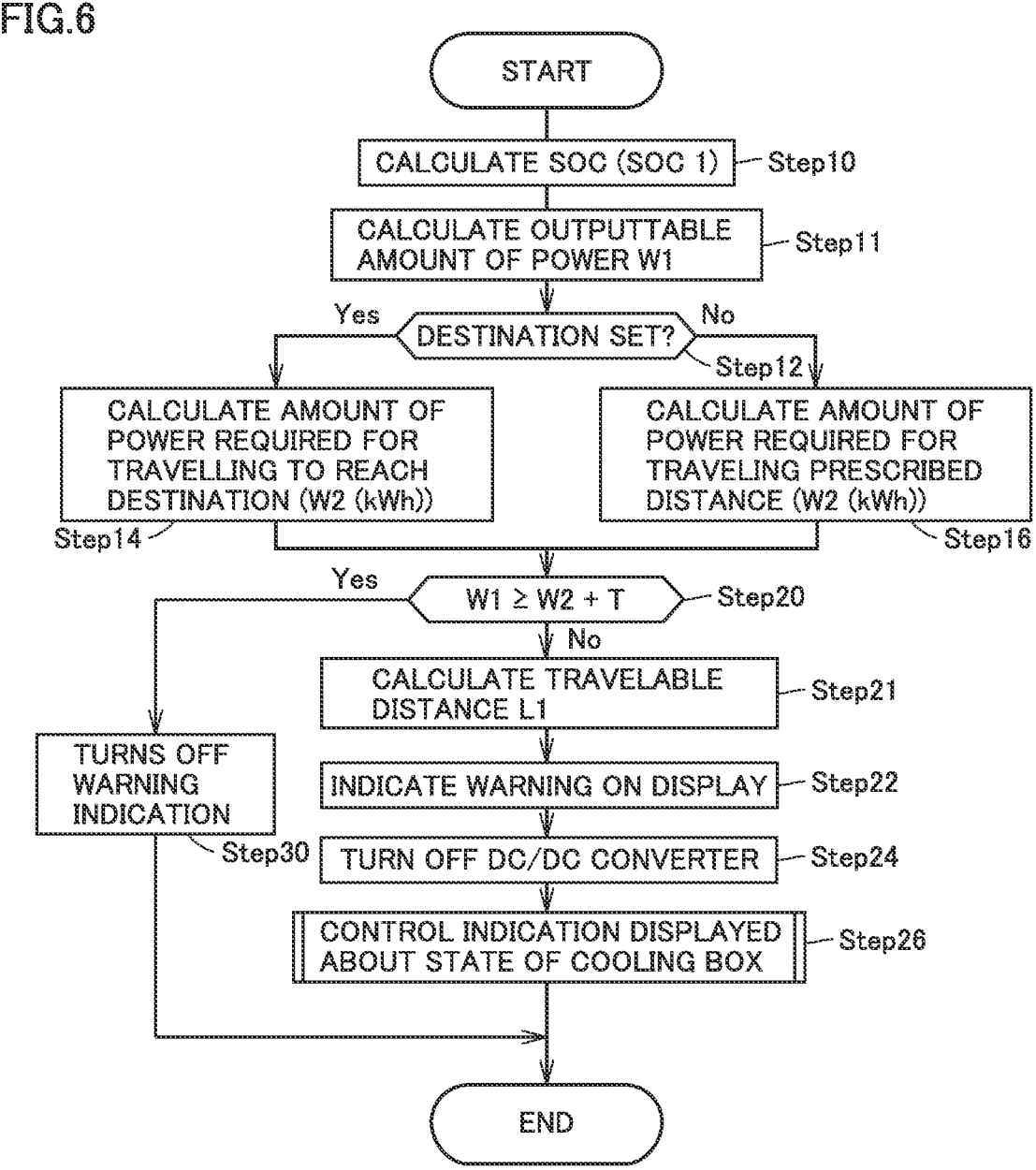
FIG. 6 is a flowchart of controlling electric vehicle 1.

This control flow will be described in detail with reference to FIG. 6. FIG. 6 is a flowchart of controlling electric vehicle 1.

ECU 24 calculates an SOC 1 representing the current SOC of battery 20 (Step 10). The SOC of battery 20 is calculated based on the measurement results transmitted from temperature sensor 45, current sensor 44, and voltage sensor 43 to ECU 24, and the database stored in storage 27 for calculating the SOC of battery 20.

Subsequently, an amount of power that can be output from the current SOC 1 of battery 20 (an outputtable amount of power W1) is calculated (Step 11).

After calculation of the outputtable amount of power W1, ECU 24 determines whether a destination has been set by a user (Step 12).

When ECU 24 determines that the destination is set (Yes in Step 12), ECU 24 calculates an amount of power required for electric vehicle 1 to reach the destination (an amount of power required for travelling W2 (kWh)) (Step 14).

This amount of power is calculated from, for example, a distance from the current position to the destination, a gradient of a planned traveling route, a planned traveling speed, and the like. Information such as the distance and the gradient can be derived from the map data stored in storage 27. The planned traveling speed is calculated by ECU 24 from the map data, information of the current position, and the like.

When ECU 24 determines that no destination is set (No in Step 10), ECU 24 calculates an amount of power required for traveling a prescribed distance (an amount of power required for travelling W2 (kWh)) (Step 16). The prescribed distance is a preset distance such as 10 km, for example, and is stored in storage 27.

When the destination is set and ECU 24 calculates the amount of power required for travelling W2, ECU 24 determines whether the outputtable amount of power W1 is equal to or larger than the amount of power required for travelling W2 plus a prescribed value T (a threshold value) (Step 20). When the destination is set, prescribed value T is a predetermined value, and is, for example, an amount of power required for travelling several kilometers.

When the destination is set, prescribed value T is not limited to such a fixed value as described above, and for example, prescribed value T may be set as an amount power required for electric vehicle 1 to move to a charging station closest to the destination.

Accordingly, when the destination is set, the amount of power required for travelling W2 plus prescribed value T (the threshold value) is larger than power required for electric vehicle 1 to travel to reach the destination.

When no destination is set and ECU 24 calculates the amount of power required for travelling W2, ECU 24 determines, with prescribed value T being 0, whether the outputtable amount of power W1 is equal to or larger than the amount of power required for travelling W2 (an amount of power required for traveling a prescribed distance: a threshold value) (Step 20).

Accordingly, when no destination is set, the amount of power required for travelling W2 plus prescribed value T (=0) (the threshold value), will be power required for electric vehicle 1 to travel the prescribed distance.

When ECU 24 determines that the outputtable amount of power W1 is smaller than the threshold value (No in Step 22), ECU 24 calculates a travelable distance L1 to which electric vehicle 1 can travel with the outputtable amount of power W1 (Step 21).

Travelable distance L1 can be calculated from the outputtable amount of power W1 and the database for calculating a travelable distance of electric vehicle 1.

After calculation of travelable distance L1, ECU 24 displays a warning on display 26 (Step 22).

Figure 7:
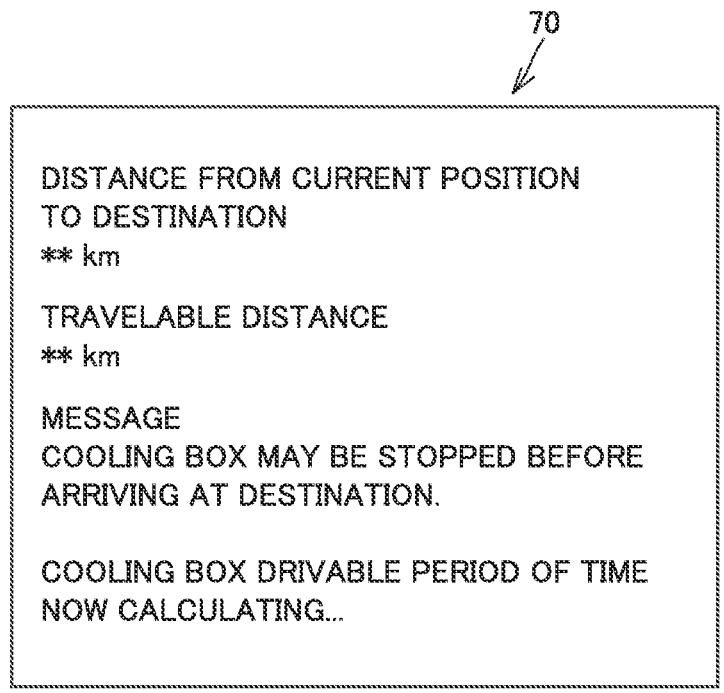
FIG. 7 is a schematic diagram showing a display 26 with a warning indicated.

FIG. 7 is a schematic diagram showing display 26 with a warning indicated. FIG. 7 shows a warning indicated when a destination is set.

On display 26, an image 70 is displayed. Image 70 includes a distance from the current position to the destination, travelable distance L1, and a message.

The message includes information indicating that the cooling box may be stopped before the destination is reached, and indicating that a drivable period of time of the cooling box is currently being calculated.

Figure 8:
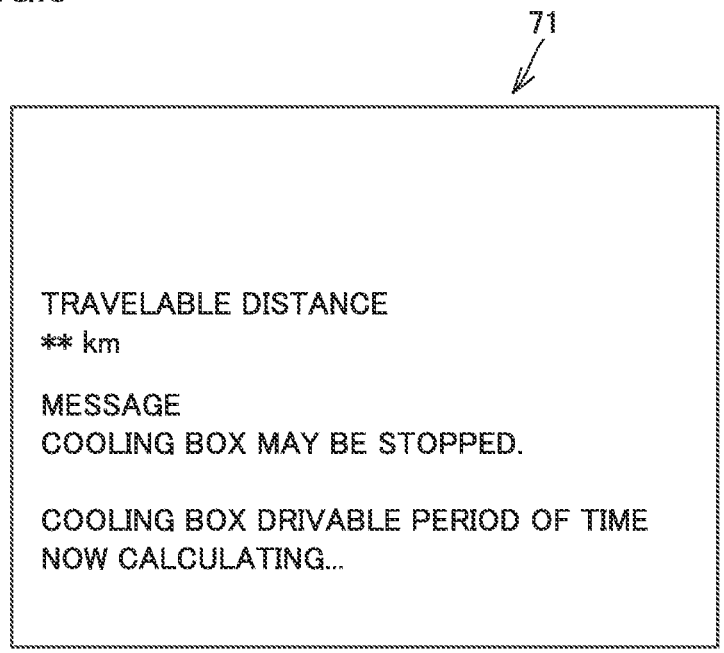
FIG. 8 is a diagram schematically showing an image 71 showing a warning indicated when no destination is set.

FIG. 8 is a diagram schematically showing an image 71 showing a warning indicated when no destination is set. Image 71 includes travelable distance L1 and a message.

The message includes information indicating that the cooling box may be stopped, and indicating that the drivable period of time of the cooling box is currently being calculated.

Returning to FIG. 6, ECU 24 stops driving DC/DC converter 30 (Step 24). In doing so, for example when driving DC/DC converter 30 is currently stopped, DC/DC converter 30 is kept in the stopped state. When DC/DC converter 30 is currently driven, DC/DC converter 30 is stopped.

As a result, a loss otherwise caused in DC/DC converter 30, and hence wasteful consumption of power remaining in battery 20, can be suppressed.

This can increase a travelable distance of electric vehicle 1 with the power remaining in battery 20.

When DC/DC converter 30 is stopped, the power of battery 20 is no longer supplied to auxiliary battery 42. Accordingly, Peltier elements 47, 48 will be driven only by power remaining in auxiliary battery 42. ECU 24 controls an indication displayed about a state of the cooling box (Step 26).

Figure 9:
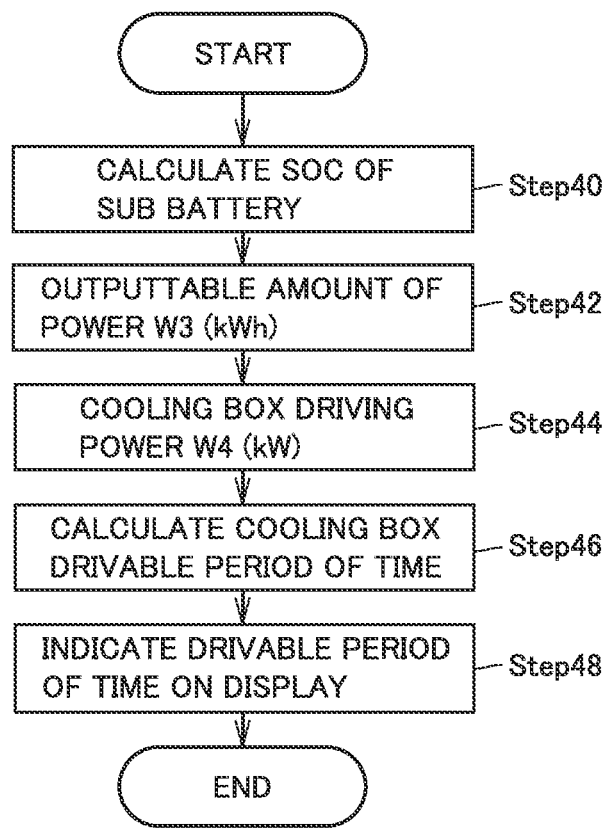
FIG. 9 is a flowchart of controlling an indication displayed regarding a state of the cooling box.

FIG. 9 is a flowchart of controlling an indication displayed about a state of the cooling box. ECU 24 calculates the SOC of auxiliary battery 42 (Step 40). ECU 24 calculates an SOC 3 representing the current SOC of auxiliary battery 42 by using the voltage of auxiliary battery 42 received from voltage sensor 32 and the database stored in storage 27 for calculating the SOC of auxiliary battery 42.

Once the current SOC 3 of auxiliary battery 42 has been calculated, ECU 24 calculates an amount of power that can be output from auxiliary battery 42 of the current SOC 3 (an outputtable amount of power W3) (Step 42).

ECU 24 calculates a driving power W4 required per unit time to drive cooling box 23 (Step 44). Driving power W4 can be calculated from the current temperature of the refrigerating compartment of cooling box 23, a target temperature of the refrigerating compartment, the current temperature of the freezing compartment, and a target temperature of the freezing compartment, as transmitted via operation unit 54, and a database stored in storage 27.

ECU 24 calculates a drivable period of time T10 for which cooling box 23 can be driven (Step 46). Drivable period of time T10 is calculated based on the outputtable amount of power W3 and driving power W4.

Once drivable period of time T10 has been calculated, ECU 24 causes display 26 to indicate drivable period of time T10.

Figure 10:
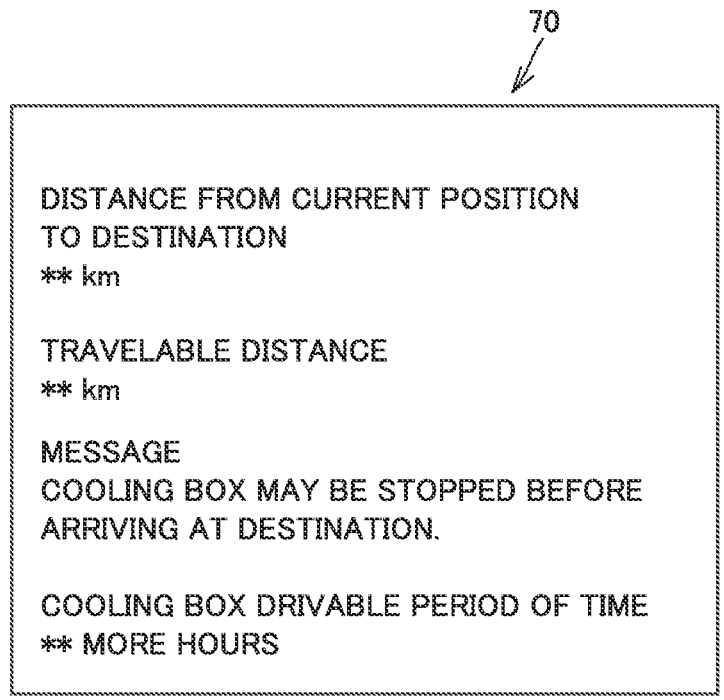
FIG. 10 is a schematic diagram showing display 26 when a destination is set.
Figure 11:
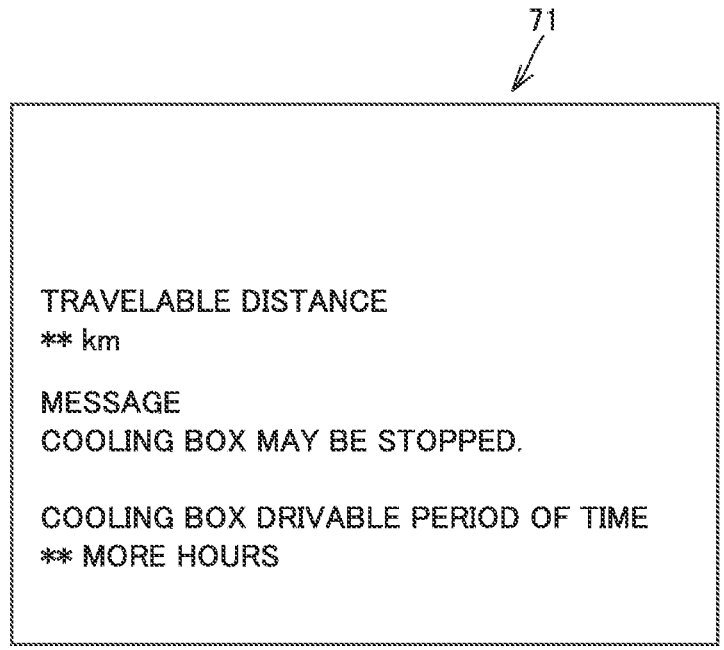
FIG. 11 is a schematic diagram showing display 26 when no destination is set.

FIG. 10 is a schematic diagram showing display 26 when a destination is set. In image 70, in place of an indication that drivable period of time T10 is being calculated, a calculated drivable period of time T10 is additionally indicated. FIG. 11 is a schematic diagram showing display 26 when no destination is set. In image 71, in place of an indication that drivable period of time T10 is being calculated, a calculated drivable period of time T10 is additionally indicated.

Thus, electric vehicle 1 can notify a user of when cooling box 23 is stopped or the like, and the user can easily grasp a state of electric vehicle 1. While in the present embodiment, display 26 is used as a device for notifying a user of a state of electric vehicle 1, an audio device such as a speaker may be used, for example.

In this way, Step 26 ends. Returning to FIG. 6, in Step 20 when ECU 24 determines that the outputtable amount of power W1 is equal to or larger than the amount of power required for travelling W2 plus prescribed value T (Yes in Step 20), ECU 24 turns off the warning indication (Step 30). Note that when no warning indication is displayed on display 26, the state with no warning indication displayed is maintained.

The control flow shown in FIG. 6 is performed continuously or intermittently when electric vehicle 1 is activated.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An electric vehicle comprising: a
rotary electric machine configured to generate a driving force for driving wheels;
a driving battery storing power to drive the rotary electric machine;
a converter connected to the driving battery;
an auxiliary battery connected to the driving battery via the converter;
a cooling box connected to the auxiliary battery; and
a notification device configured to notify a user of information,
wherein when the SOC of the driving battery becomes smaller than a threshold value, the notification device is configured to notify the user of a drivable period of time for which the cooling box can be driven with power remaining in the auxiliary battery.

2. The electric vehicle according to claim 1, wherein the auxiliary battery is supplied with power from the driving battery by driving the converter.

* * * * *